United States Patent
Henderson et al.

(10) Patent No.: US 8,031,193 B1
(45) Date of Patent: Oct. 4, 2011

(54) DYNAMIC LIGHT SHADING IN TERRAIN RENDERING APPLICATIONS

(75) Inventors: James P. Henderson, Cedar Rapids, IA (US); Jeffrey D. Russell, Marion, IA (US); Tom C. Rohr, Hiawatha, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1105 days.

(21) Appl. No.: 11/698,012

(22) Filed: Jan. 25, 2007

(51) Int. Cl.
  *G06T 15/50* (2006.01)
  *G06T 15/60* (2006.01)
  *G09G 5/02* (2006.01)
  *G09G 5/00* (2006.01)

(52) U.S. Cl. ......... 345/426; 345/601; 345/602; 345/614

(58) Field of Classification Search .............. 345/426, 345/601, 602, 614
See application file for complete search history.

(56) References Cited

U.S. PATENT DOCUMENTS

| | | | | |
|---|---|---|---|---|
| 4,682,160 A | * | 7/1987 | Beckwith et al. | 345/421 |
| 5,573,402 A | * | 11/1996 | Gray | 434/69 |
| 5,864,342 A | * | 1/1999 | Kajiya et al. | 345/418 |
| 5,905,503 A | * | 5/1999 | Penna | 345/426 |
| 5,977,977 A | * | 11/1999 | Kajiya et al. | 345/418 |
| 6,593,924 B1 | * | 7/2003 | Lake et al. | 345/426 |
| 2002/0101419 A1 | * | 8/2002 | Cook | 345/426 |
| 2007/0018980 A1 | * | 1/2007 | Berteig et al. | 345/426 |

* cited by examiner

*Primary Examiner* — Kee M Tung
*Assistant Examiner* — Robert Craddock
(74) *Attorney, Agent, or Firm* — Daniel M. Barbieri (57) ABSTRACT

In some embodiments, a method for high-performance terrain rendering may include one or more of the following steps: (a) obtaining elevation data, (b) determining slope of a terrain surface, (c) selecting a shading model to apply to the terrain surface based upon the slope of the terrain surface, (d) determining if a vehicle's heading has changed, and (e) aligning the shading model index based upon current heading.

14 Claims, 10 Drawing Sheets

DYNAMIC LIGHT SHADING IN TERRAIN RENDERING APPLICATIONS

FIELD OF THE INVENTION

Embodiments of the present invention relate to computer rendering. Particularly, embodiments of the present invention relate to computer rendering of terrain for most any vehicle. More particularly, embodiments of the present invention relate to dynamic light shading in high performance terrain rendering applications.

BACKGROUND OF THE INVENTION

Rendering is the process of generating an image from a model, by means of software programs or electronic hardware. The model is a description of three dimensional objects in a strictly defined language or data structure. The model may contain geometry, viewpoint, texture and shading information. The image, produced from rendering, is a digital image or raster graphics image. 'Rendering' is also used to describe the process of calculating effects in a video editing file to produce final video output.

Rendering is one of the major sub-topics of 3D computer graphics, and in practice always connected to the others. In the graphics pipeline, it is the last major step, giving the final appearance to models. With the increasing sophistication of computer graphics since the 1970's onward, it has become a more distinct subject.

In computer graphics, shading refers to the process of altering a color of a surface based on its angle to lights to create a photorealistic effect. Shading is performed during the rendering process.

Flat shading is a shading technique used in 3D (three dimensional) computer graphics. It shades each polygon of an object based on the angle between the polygon's surface normal and the direction of the light source, their respective colors, and the intensity of the light source. A surface normal, or just normal to a flat surface is a three-dimensional vector which is perpendicular to that surface. A normal to a non-flat surface at a point p on the surface is a vector which is perpendicular to the tangent plane to that surface at p. The word normal is also used as an adjective as well as a noun with this meaning: a line normal to a plane, the normal component of a force, the normal vector, etc.

Illumination shading of surfaces (such as terrain) is typically accomplished through a set of vector calculations repeated for each point in the surface. When an application demands a changing orientation of the light sources, the calculations must be repeated.

This requires considerable computation resources for avionics systems where the light source moves dynamically with mid-flight heading changes. This light movement is required for human factors depth-cueing reasons. Correct depth cueing is best maintained with the dominant light source positioned approximately 45 degrees to the left of current heading and some fixed angle above the horizon. High-performance terrain rendering applications require complex shading models consisting of multiple light sources varying in direction, intensity, and chromaticity. The increased computational complexity adds to the cost and complexity of the system. For terrain representations, calculation precision must be relatively high to avoid a noisy appearance in smooth regions.

Therefore, it would be desirable to provide a method and apparatus to reduce computational resources and cost for light shading in high-performance terrain rendering applications.

SUMMARY OF THE INVENTION

In some embodiments, a method for high-performance terrain rendering may include one or more of the following steps: (a) obtaining elevation data, (b) determining slope of a terrain surface, (c) selecting a shading model to apply to the terrain surface based upon the slope of the terrain surface, (d) determining if a vehicle's heading has changed, and (e) selecting a new shading model based upon a number of light sources.

In some embodiments, a terrain light shading system may include one or more of the following features: (a) a data storage device comprising, (i) a topographical program that determines shading for topography around a vehicle based upon a predetermined shading process, and (b) a processor coupled to the data storage device that executes the topographical program.

In some embodiments, a machine readable medium comprising machine executable instructions may include one or more of the following features: (a) slope instructions that compute a north-south and east-west slope, (b) surface normal instructions that calculate a surface normal based upon the north-south and east-west slope, (c) shading instructions that calculate a shading for at least one point on a topography based on the surface normal, (d) quantizing instructions that quantize the surface normal to a closest shading model, (e) storing instructions that store the result of the quantizing instructions, (f) horizontal adjusting instructions to align a shading model, (g) scanning instructions that scan in a shading index point, and (h) display instructions that display a pixel.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to embodiments of the invention, examples of which are illustrated in the accompanying drawings.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Embodiments of the present invention for the purposes of this discussion can be implemented in hardware. Embodiments could be implemented in software, but this would be difficult due to the speeds put upon operating software which would slow processing down substantially. Embodiments of the invention may include a "hardware accelerator" specifically for illumination shading of three dimensional surfaces.

Present real-time image processing systems may include input processing, storage, and output processing. Timing restrictions ordinarily force complex computations to the input side of the process. Therefore, when input parameters change, such as illumination light source position, the contents of the image storage must be re-processed.

Embodiments of the present invention resolve this problem by eliminating re-processing of the source data due to movement of the illumination source. Embodiments of the present invention also allow for the use of complex shading models in resource-constrained embedded graphics systems by performing complex calculations off-line. Further efficiency is realized by the distribution of precision offered by this invention, discussed in more detail below.

Embodiments of the present invention may change the structure of the typical image processing system by what is stored in image memory. Instead of storing pixels from a pre-shaded image, embodiments of the present invention store an image dataset comprised of surface normals. The surface normal, which defines the direction in which the data point is facing, is stored as a polar-coordinate index to a shading look-up table stored in memory. The normal definition is divided into a horizontal azimuth and a vertical azimuth. A representation of a shading look-up table uses a 3 bit vertical azimuth and a 5 bit horizontal azimuth.

The adjustment of the lateral angle of the illumination source may be accomplished by adding a correction angle to the horizontal azimuth prior to applying the index to the shading look-up table. The shading look-up table may be loaded with shading percentages derived from any shading model, including those with multiple light sources. The computation of these values is done off-line, so complex shading models add no complexity to the system. The shading look-up table may be constructed so that near-flat regions are represented with greater precision than steep, rough regions. This places the highest precision in regions where lack of precision would be most obvious.

Figure 1:
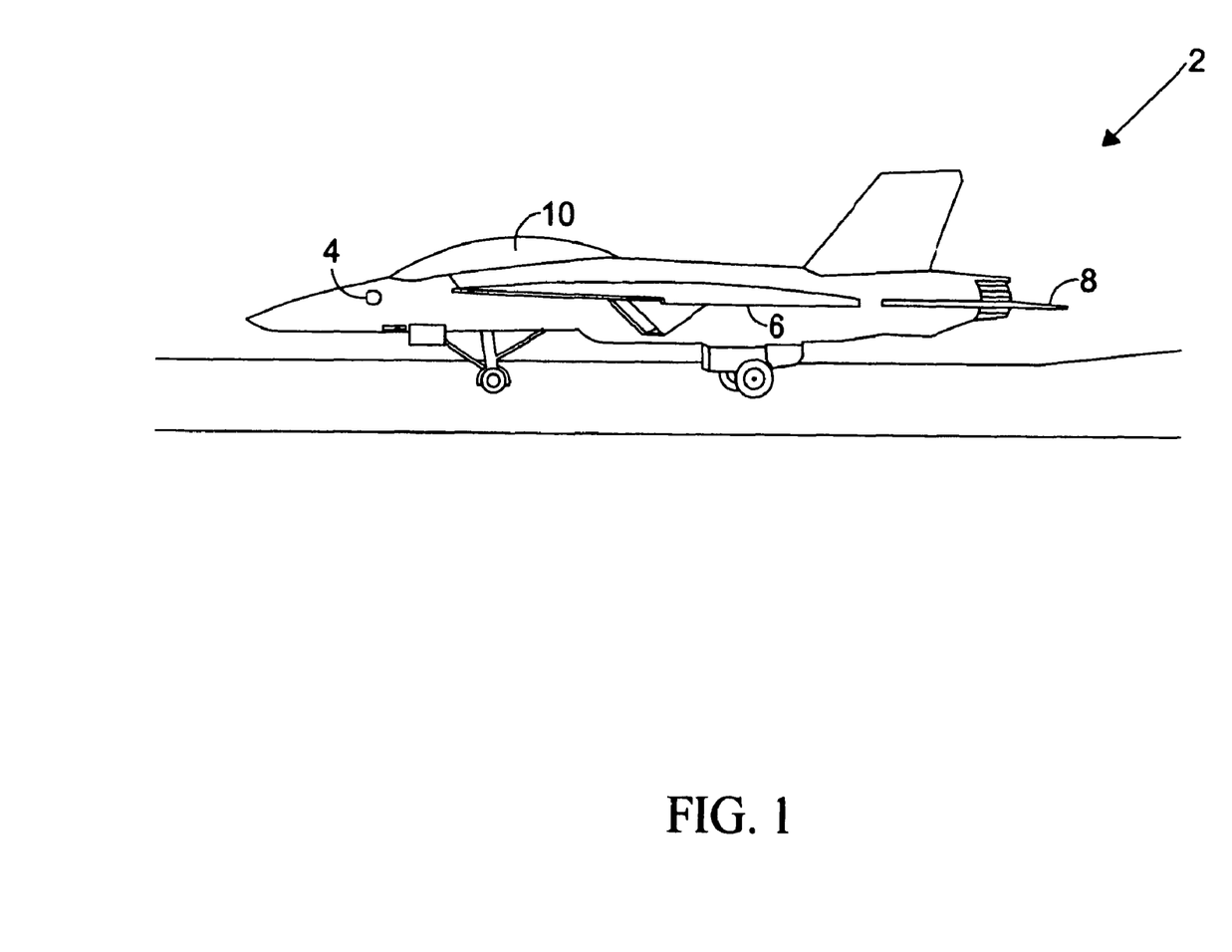
FIG. 1 is a side profile view of an aircraft in an embodiment of the present invention.

For purposes of the disclosure, embodiments of the present invention can be implemented on most any type of vehicle, such as an aircraft shown in FIG. 1. A modern fighter aircraft 2 includes a fuselage 4 having a pair of wings 6, a tail 8, and a transparent pilot canopy 10. While the description of the present invention is referenced to fighter aircraft 2, it is fully contemplated that embodiments of the present invention could be extended to any aircraft, including cargo planes, airliners, and business aircraft without departing from the spirit of the invention.

Figure 2:
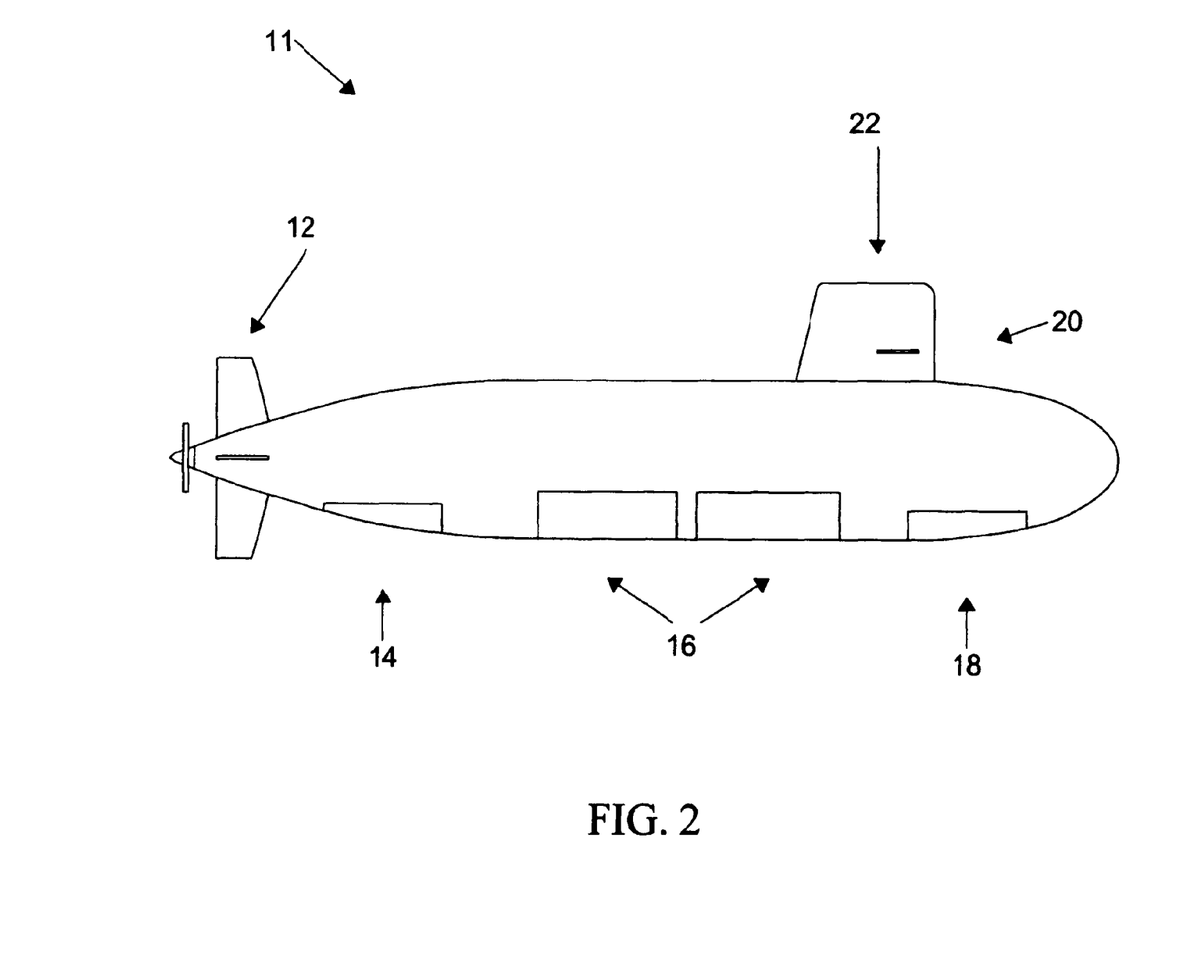
FIG. 2 is a side profile view of a submarine in an embodiment of the present invention.

With reference to FIG. 2, a side profile view of a submarine in an embodiment of the present invention is shown. Embodiments of the present invention can also be implemented on a submarine 11. Submarine 11 could have tailplanes 12, rear trim tank 14, main ballast tanks 16, forward ballast tank 16, foreplanes 18, and a sail 22. It is fully contemplated that embodiments of the present invention could be extended to any waterborne vessel, including surface ships and other submersibles without departing from the spirit of the invention.

Figure 3:
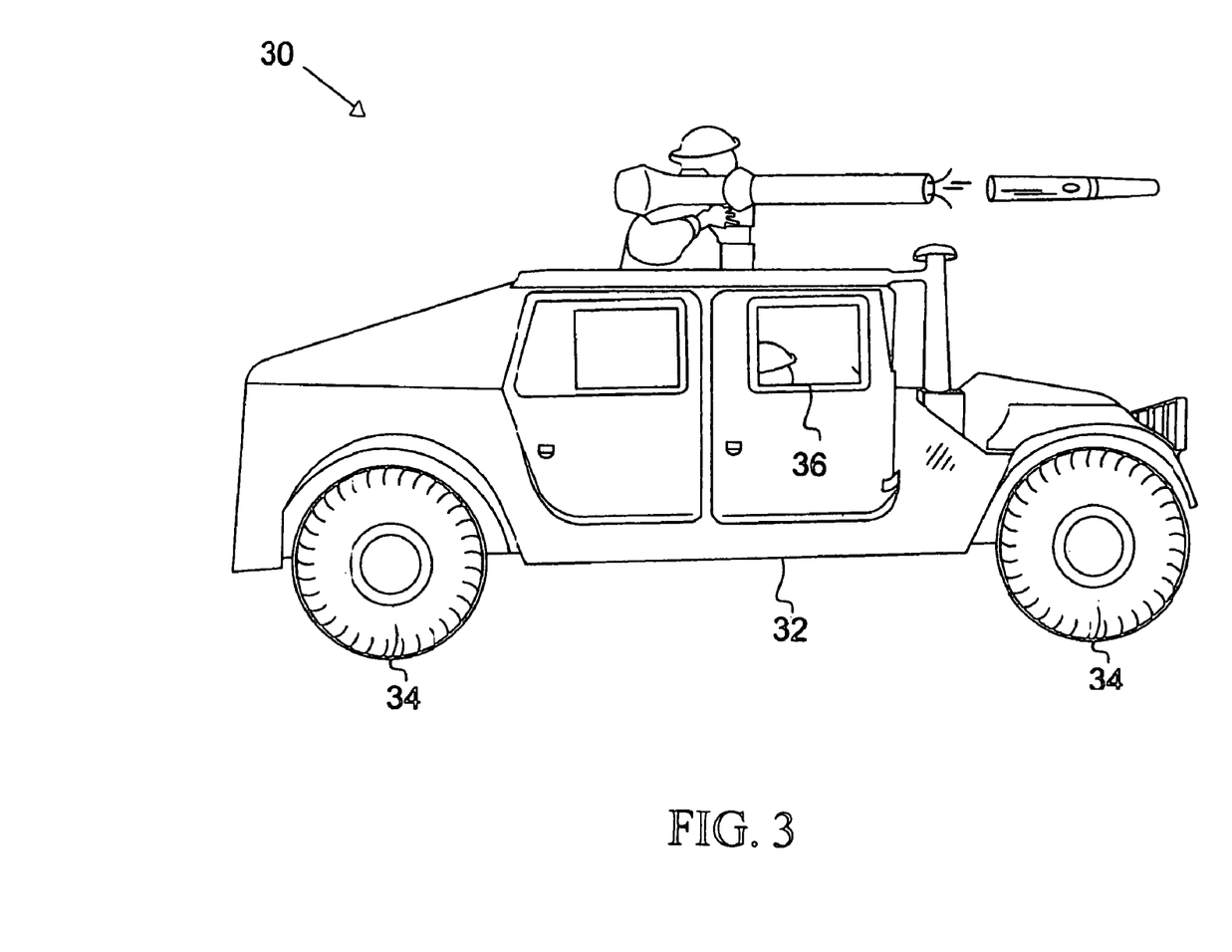
FIG. 3 is a side profile view of a military vehicle in an embodiment of the present invention.

With reference to FIG. 3, a side profile view of a military vehicle in an embodiment of the present invention is shown. Vehicle 30 can have a chassis 32, at least two wheels 34, and an operator seating area 36. It is contemplated that vehicle 30 could be most any type of vehicle, such as a motorcycle, car, truck, or tractor-trailer, without departing from the spirit of the invention.

For purposes of the remaining disclosure embodiments of the present invention will be described with respect to aircraft 2, however, it is fully contemplated that embodiments of the present invention could be utilized on almost any type of transportation including those mentioned above and spacecraft.

Figure 4:
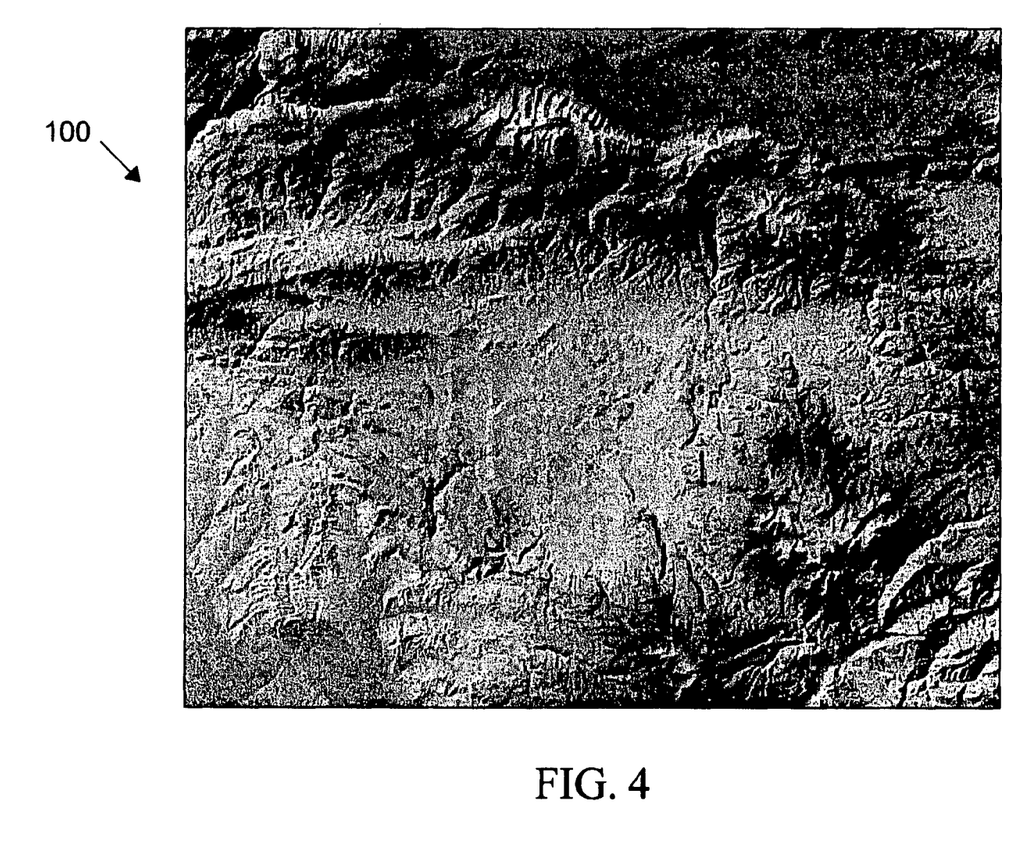
FIG. 4 is a digital terrain model in an embodiment of the present invention.

With reference to FIG. 4, a digital terrain model in an embodiment of the present invention is shown. A digital terrain model (DTM) 100 can be a visual indication of the terrain. DTM 100 is a topographic model of the bare earth that can be manipulated by computer programs. The most common type of DTM 100 is a digital elevation model, in which the elevation data of the terrain is recorded in a raster digital format. Vegetation, buildings and other cultural features are removed digitally leaving just the underlying terrain. It is also noted that submarine elevation (known as bathymetry) data can be generated using ship mounted depth soundings.

DTM 100 may be created from digital terrain elevation data (DTED). DTED was originally developed in the 1970s to support aircraft radar simulation and prediction. DTED supports many applications, including line-of-sight analyses, terrain profiling, 3-D terrain visualization, mission planning/rehearsal, and modeling and simulation. DIED is a standard NGA (National Geospatial-Intelligence Agency) product that provides medium resolution, quantitative data in a digital format for military system applications that require terrain elevation. The DIED format for level 0, 1 and 2 is described in U.S. Military Specification Digital Terrain Elevation Data (DTED) MIL-PRF-89020B, and amongst others describe the resolution: level 0 has a post spacing of 30 arcseconds in latitude direction (ca. 900 meters); level 1 has a post spacing of 3 arcseconds (ca. 90 meters); and level 2 has a post spacing of 1 arcseconds (ca. 30 meters). In addition three more levels (3, 4 and 5) at increasing resolution have been proposed, but not yet standardized.

Figure 5:
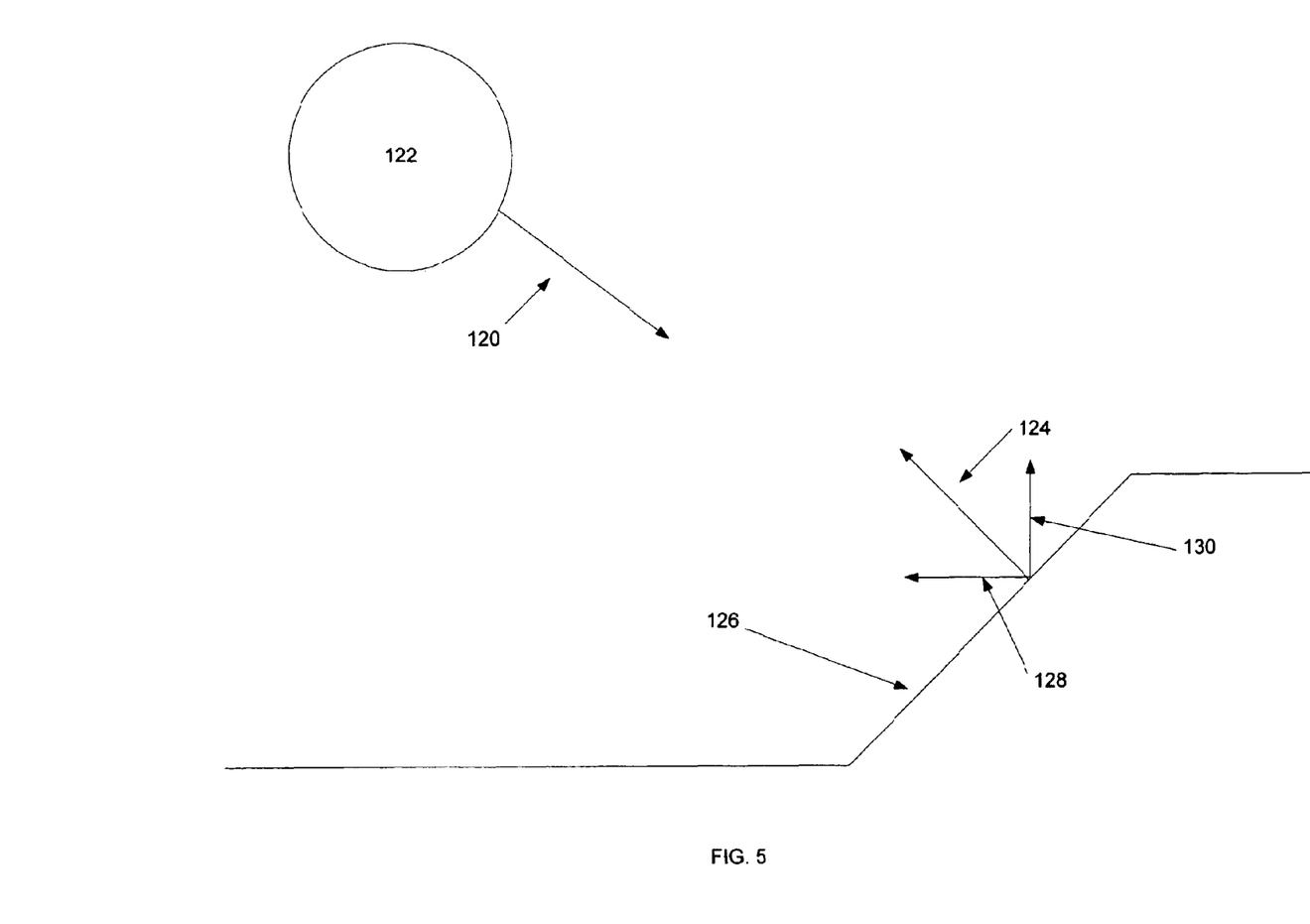
FIG. 5 shows an illumination vector and a unit surface vector in an embodiment of the present invention.

With reference to FIG. 5, an illumination vector and a unit surface vector in an embodiment of the present invention is shown. Sun-shading or shaded relief or hill-shading simulates the cast shadow thrown upon a raised relief map, or more abstractly the shadow of the sun. Traditionally drawn with charcoal and other traditional media, shaded relief is today almost exclusively computer-generated. A illumination factor may be determined by computing the dot product of unit illumination vector 120 coming from a light source 122 with a unit surface normal vector 124 perpendicular to surface 126. The surface normal vector represents the three-dimensional slope of a point on the surface. Once the illumination factor is calculated, a rendering application may properly shade surface 126.

The more surfaces of a terrain may cause more calculations required by the rendering application. The rendering application may have to process equation (1) thousands and possibly millions of times to render a terrain at any point in time.

Surface Normal Vector $$\left[ \begin{pmatrix} 2d(elevW - elevE),\ 2d(elevN - elevS), \\ \\ \dfrac{4d2}{\sqrt{((d(elevW - elevE))^2 + (2d(elevN - elevS))^2 + (2d)^2)}} \end{pmatrix} \right] \quad (1)$$

Result of Dot Product with Simplest Illumination Vector [1,1,1]

$$\left( \begin{array}{l} 2d(elevW - elevE) + 2d(elevN - elevS) + \\ \\ \dfrac{4d2}{\sqrt{((d(elevW - elevE))^2 + (2d(elevN - elevS))^2 + (2d)^2)}} \end{array} \right) \quad (2)$$

Where W is west, E is east, N is north, S is south, and d is distance. Equation (1) may be used for the simplest light position. Equation (1) may only yield shading for the simplest illumination vector [1,1,1] which is 45 degrees above the horizon and from halfway between north and west. Other vector definitions may make it more difficult due to conversions between coordinate systems. For example, if it was desired to rotate the position of the illumination vector by some degrees, polar coordinates may be rotated. Then, a conversion to rectangular coordinates requires more square roots, division and sine/cosine computations. These math operations are very hardware unfriendly due to the square root and divide operations. They may be accomplished slowly, with a reasonable amount of hardware, but real-time display systems require rapid updates and are particularly intolerant of latency. Also, to maintain the correct perceived depth visual cueing, the light source should remain aligned to the viewer's perspective. As this perspective changes, such as when a vehicle's heading changes, the calculations must be repeated using the "new" illumination vector. This prevents pre-processing of the image as a possible shortcut. Since a typical display system generates images at rates between 50 and 200 million pixels per second, only a very large, powerful and expensive arithmetic engine may keep pace.

Figure 6:
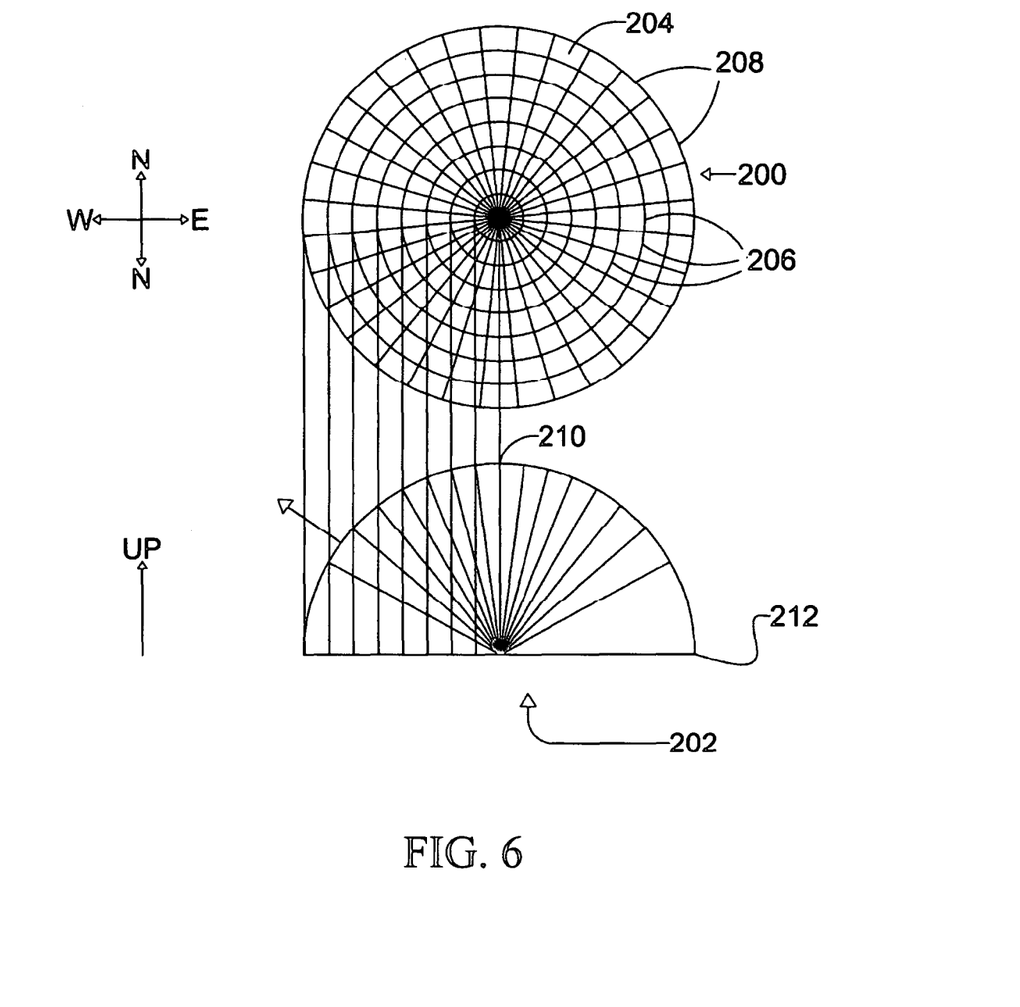
FIG. 6 shows a shading model in an embodiment of the present invention.

With reference to FIG. 6, a shading model in an embodiment of the present invention is shown. A first stage involves deriving a numerical value for a three-dimensional slope of each point in a given height field (e.g., array of elevations). Three-dimensional slopes encountered in a terrain may be represented as points on a half sphere 202. Points near apex 210 of the half-sphere 202 are nearly horizontal and represent correspondingly flat points in the terrain such as a plain. Points near edge 212 of the half-sphere 202 are very steep and represent steep points in the terrain such as mountain slopes. Likewise, points near north edge 210 of the half-sphere 202 represent points in the terrain that slope towards north. Half-sphere 202 is divided into a finite number of sections 204, each representing a quantized three-dimensional slope. A vertical azimuth combined with a horizontal azimuth addresses each slope.

A power of two may be utilized to represent the azimuth indices. With reference to FIG. 6, eight divisions of vertical azimuth 208 may be represented by 3 bits and thirty-two divisions of horizontal azimuth 206 may be represented by 5 bits. The resulting slope index may be a single 8-bit value.

A slope index value is assigned to each point 204 in a given height field (e.g., array of elevations) converting the height field into an array of three-dimensional slopes. The real-time shaded imagery rendering operates on the resulting array of slopes. This may be accomplished via arithmetic functions, look-up table functions, or off-line pre-processing of the height field.

A shading model table 200 may take the same form as, and may map directly to, the slope table. For each facet of the half-sphere, a shading value is calculated based on a combination of any number of light sources including ambient or emissive light. The complexity of the shading model does not impose any additional burden on the real-time shading operations since it is computed off-line and stored in an easily accessed table.

To construct a shaded image representation of a section of the given height field; the stored slope index may be applied to the shading model table for each point in the array of slopes. To correct the light-source orientation for alignment with the viewer, additive correction may be made to the bits in the index that corresponds to the horizontal azimuth. To avoid flickering associated with the crossing of quantization boundaries, it may be helpful to simultaneously read and interpolate between two horizontally adjacent shading table entries. With reference again to FIG. 5, the shading of a particular normal vector may be discussed. Surface normal vector 124 may be expressed as a combination of a horizontal azimuth 128 and a vertical azimuth 130.

Figure 7:
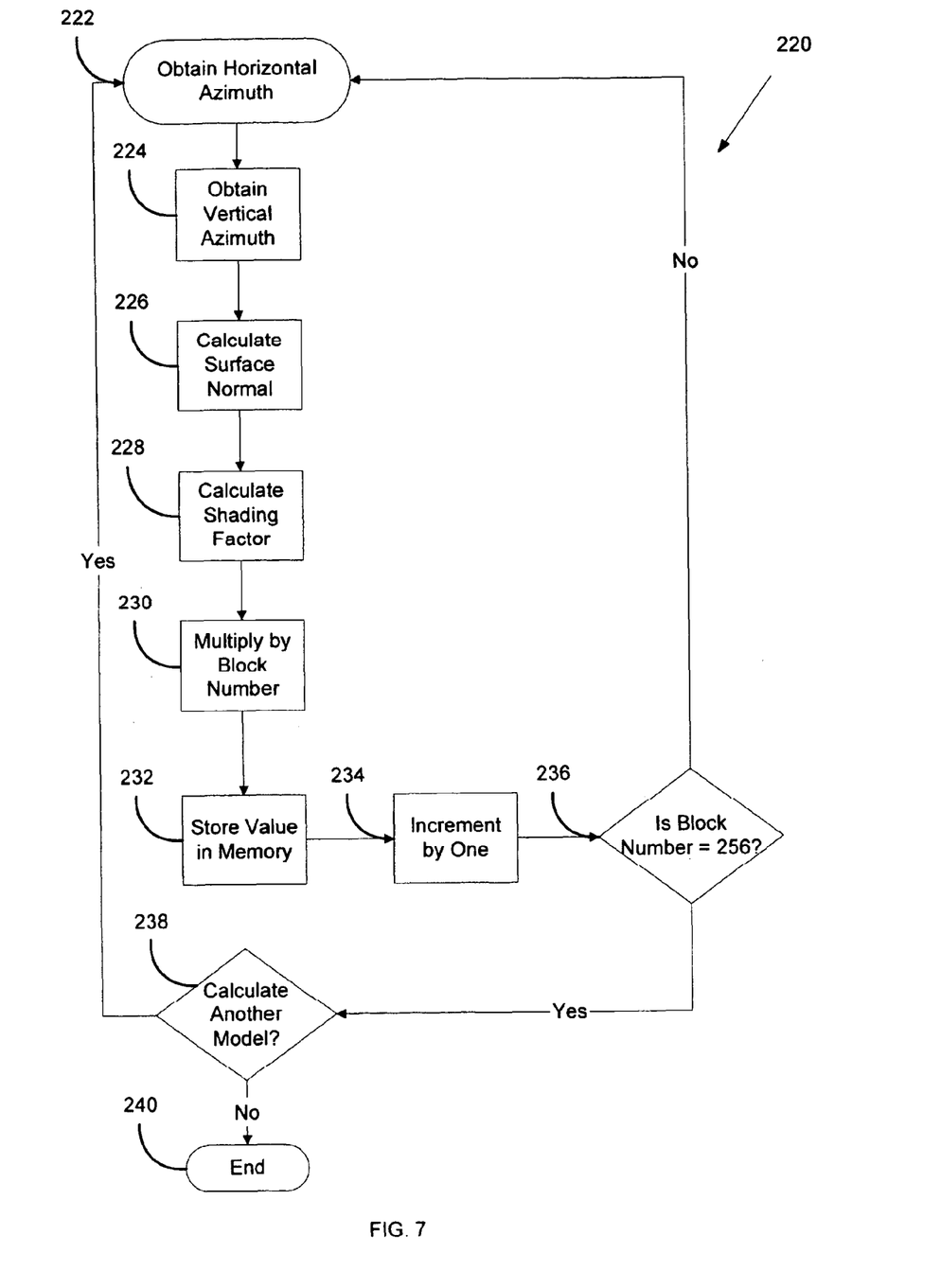
FIG. 7 is a flow chart diagram of the creation of a shading model in an embodiment of the present invention.

With reference to FIG. 7, the creation of a shading model in an embodiment of the present invention is shown. Shading model program 220 may begin at state 222 and proceeds to state 224 where the North-South and East-West slopes are calculated. Surface normal 124 may be calculated at state 226. Program 220 may quantize surface normal 124 to a nearest normal lighting model and store this nearest normal lighting model in an index at state 228. Program 220 inquires whether to start drawing at state 230. If it is determined that it is not time to start drawing, program 220 returns to state 230 to determine if it should start drawing. If it is determined that program 220 should start drawing, then program 220 proceeds to state 232 and adjusts horizontal alignment of a shading model for correct perspective.

At state 234, program 220 may scan in a data point (e.g., a shading index). Program 220 addresses a shading lookup table at state 236. Shading color may then be applied at state 238 and then a pixel may be sent to a display at state 240. Program 220 may determine if that was the last pixel in the display at state 242. If it was not the last pixel in the display, then program 220 returns to state 234 to scan in another data shading point. If it was the last pixel in the display, then program 242 returns to state 230 and starts another drawing.

It is of note, that the slopes may be computed once, on input to FPGA (discussed below). Arrays of slopes may be drawn thousands of times using program 220.

Figure 8:
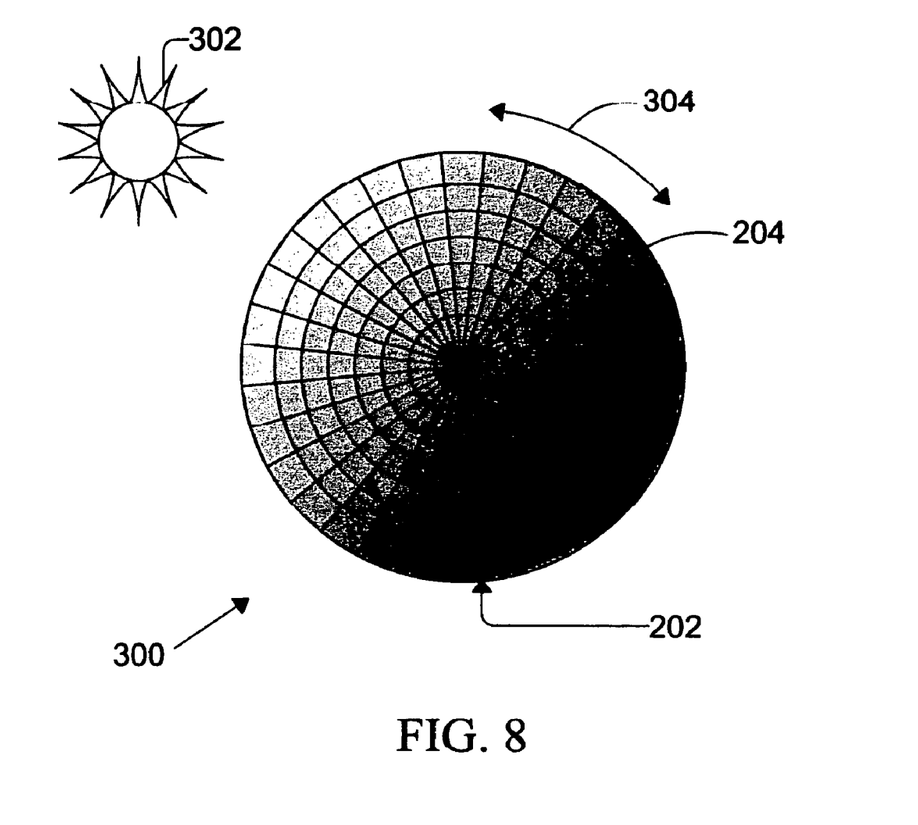
FIG. 8 is a graphical representation of a shading model in an embodiment of the present invention.

With reference to FIG. 8, a graphical representation of a shading model in an embodiment of the present invention is shown. Program 220 may apply shading to all blocks 204 of half sphere 202 creating shading model 300. The blocks sloping away from light source 302 are represented as being substantially black. While the blocks sloping toward light source 302 are represented as being substantially white.

Figure 9:
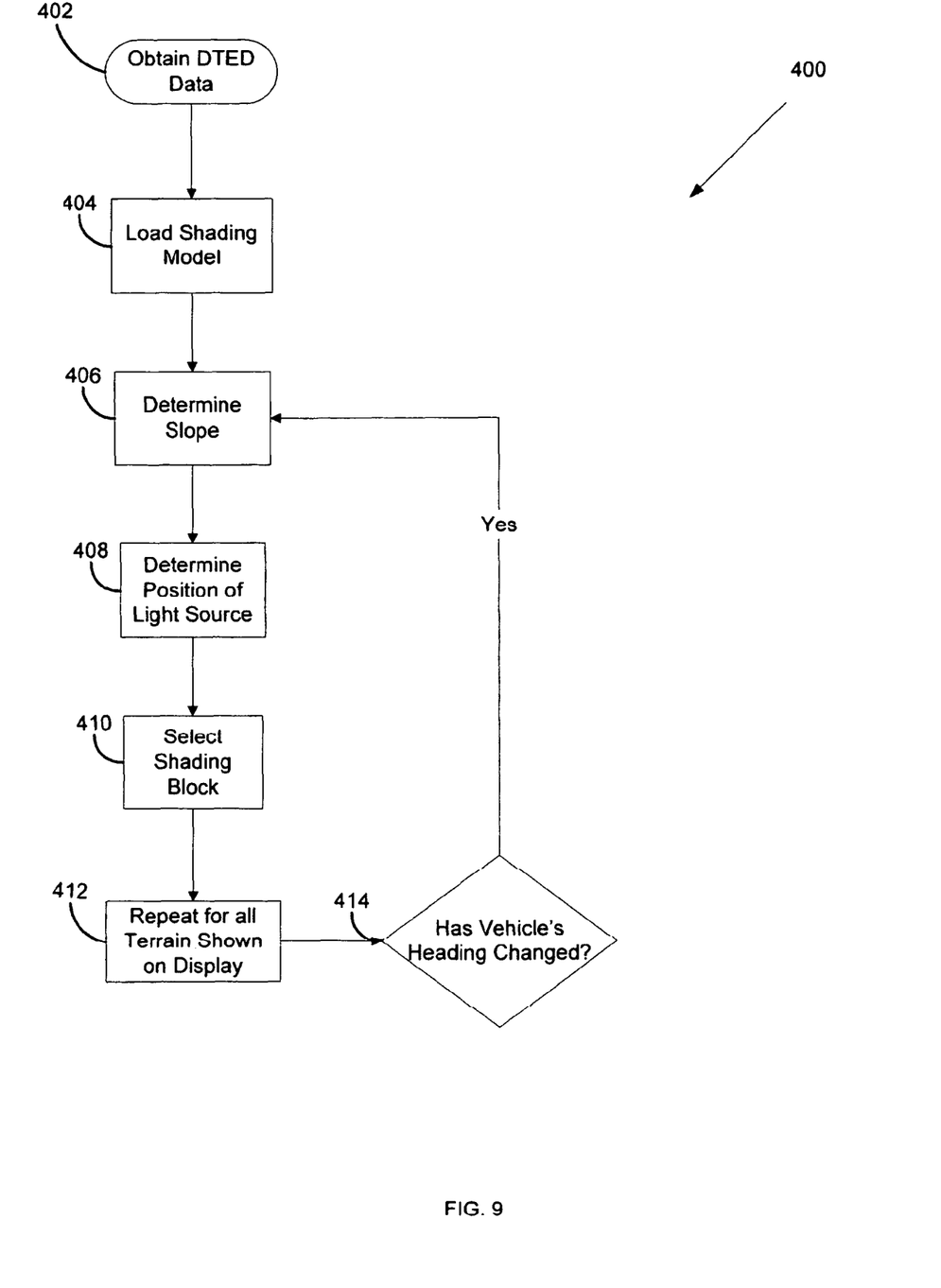
FIG. 9 is a flow chart diagram representing a topographical shading program in an embodiment of the present invention.

With respect to FIG. 9, a flow chart diagram representing a topographical shading program in an embodiment of the present invention is shown. For purposes of the discussion of FIG. 9, topographical program 400 may be implemented in a FPGA (field programmable gate array) that may be housed on aircraft 2 and is discussed in more detail with reference to FIG. 10. Referring back to aircraft 2, topographical shading program 400 may begin at state 402 where FPGA would receive a grid array of elevations (DTED). At state 404, FPGA may load lighting model 300. Topographical shading program 400 processes the DTED data to determine the slope of the terrain below at state 406. Program 400 may take a known elevation and look at the nearest elevations to the known elevation. From there, program 400 may calculate a slope based upon the difference in each points Cartesian coordinates (e.g., x,y,z). Program 400 may determine a position of a light source (e.g., possibly by the time of day for the sun). Most commonly, the light source may be something that could reasonably change no more frequently than perhaps once per minute (as the sun location changes). This is not a large factor as the image is updated thousands of times between such updates. The horizontal orientation of the light source may change with every update anywhere from 60 to 360 times a second. The determination of the light source may be determined by the pilot. The pilot may select from several light sources, such as the sun, moon, or even the aircraft itself. However, established human-factors point to the fact that correct depth cueing may be best maintained with a point light source positioned approximately 45 degrees to the left of current heading and some fixed angle above the horizon. This would give the pilot the most representative depiction of the terrain below the aircraft.

Program 400 may now select a shading block 204 based upon the slope of the terrain and the position of illumination vector 120 at state 410. Program 400 may repeat this process for each part of the terrain displayed to the pilot at state 412. At state 414, program 400 may determine if the aircraft's heading has changed, thus changing vectors 120 and 124. If the aircraft's heading has changed, program 400 rotates model 300 in the direction of the heading change shown by arrow 304 (FIG. 8). It can be seen from model 300 that as model 300 rotates, new shading blocks 204 would be introduced to DTM 100. If the aircraft is moving very quickly, program 400 may use interpolation between shading blocks 204 to give quick and accurate shading representations of the terrain.

Figure 10:
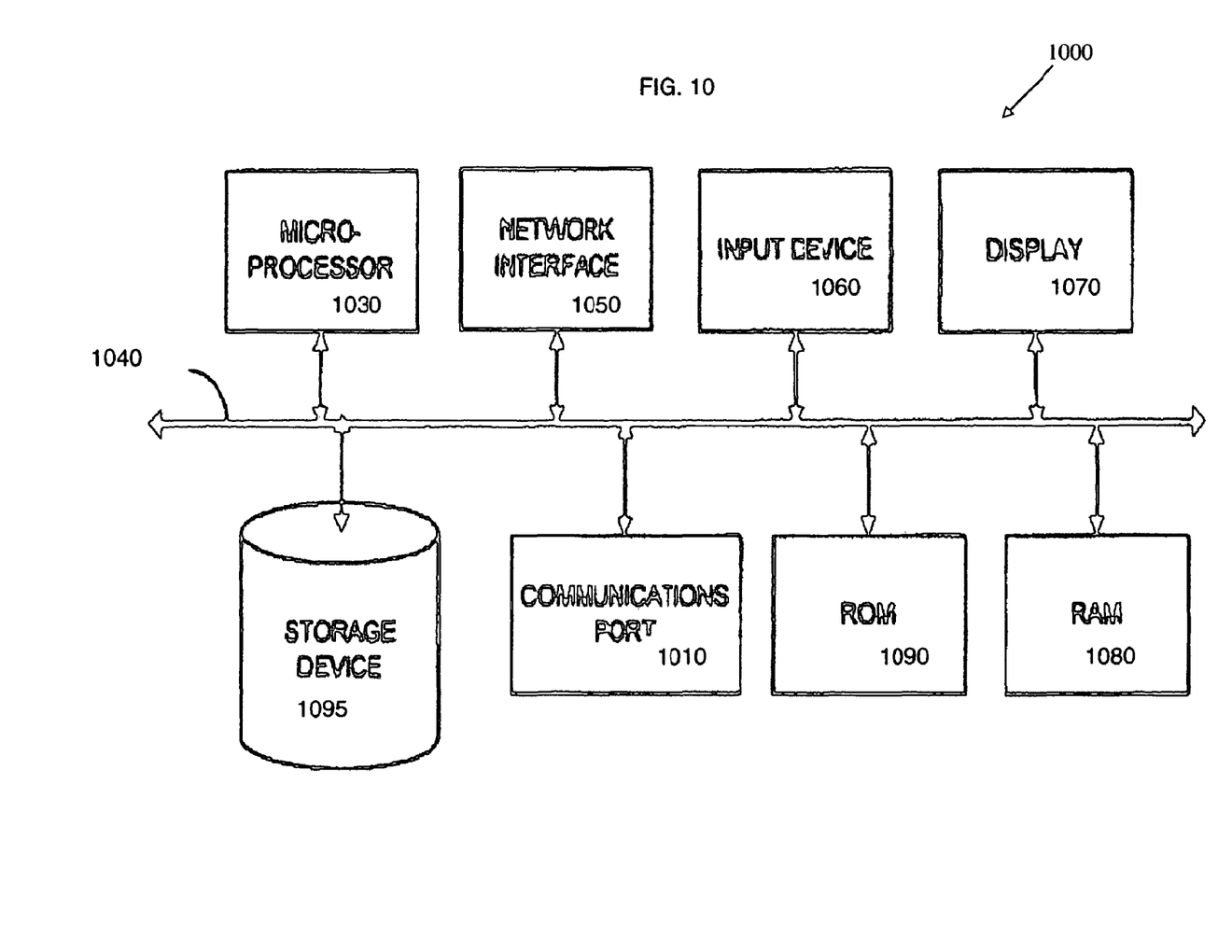
FIG. 10 is a block diagram of the internal architecture of a computing, device according to some embodiments of the invention.

FIG. 10 is a representative block diagram of a computing device (such as a computer or FPGA as discussed above) according to some embodiments. It is understood computing device 1000 may execute programs 220 and 400 described above. Computing device 1000 may comprise a single device or computer, a networked set or group of devices or computers, such as a workstation, laptop etc. Computing device 1000 is typical of a data session-capable machine. Computing device 1000 can include a microprocessor 1030 in communication with communication bus 1040. Microprocessor 1030 is used to execute processor-executable process steps so as to control the components computing device 1000 to provide functionality according to embodiments of the present invention. Microprocessor 1030 may comprise a Pentium™, or Itanium™ microprocessor manufactured by Intel™ Corporation. Other suitable processors may be available from Motorola™, Inc., AMD™, or Sun Microsystems™, Inc. Microprocessor 1030 also may comprise one or more microprocessors, controllers, memories, caches and the like.

Input device 1060 and display 1070 are also in communication with communication bus 1040. Any known input device may be used as input device 1060, including a keyboard, mouse, touch pad, voice-recognition system, or any combination of these devices. Input device 1060 may be used by a user to input information and commands and select a destination party (parties) to initiate instant messaging.

Display 1070 may be an integral or separate CRT display, a flat-panel display or the like. Display 1050 is generally used to output graphics and text to an operator in response to commands issued by microprocessor 1030. Display 1070 may display presentation data and the like which is used during the online processes session.

RAM (Random Access Memory) 1080 is connected to communication bus 1040 to provide microprocessor 1030 with fast data storage and retrieval. In this regard, processor-executable process steps being executed by microprocessor 1030 are typically stored temporarily in RAM 1080 and executed therefrom by microprocessor 1030. ROM (Read Only Memory) 1090, in contrast, may provide storage from which data can be retrieved but to which data cannot be stored. Accordingly, ROM 1090 may be used to store invariant process steps and other data, such as basic input/output instructions and data used during system boot-up or to control input device 1060. One or both of RAM 1080 and ROM 1090 may communicate directly with microprocessor 1030 instead of over communication bus 1040, or on separate dedicated busses. Data storage device 1095 stores, among other data, processor-executable process steps of presence online processes algorithms 220 and/or 400 discussed with respect to FIGS. 7 and 9. The process steps and program code of algorithms 220 and/or 400 and the like may be read from a computer-readable medium, such as a floppy disk, a CD-ROM, a DVD-ROM, a Zip™ disk, a magnetic tape, or a signal encoding the process steps/program code, and then stored in data storage device 1095 in a raw, compressed, un-compiled and/or encrypted format. In alternative embodiments, hard-wired circuitry may be used in place of, or in combination with, processor-executable process steps for implementation of the processes described herein. Thus, embodiments are not limited to any specific combination of hardware, firmware and software.

Also illustrated is a network interface 1050 which may be a wired or wireless Ethernet interface, a modem interface, and so on. In utilizing the various embodiments of the invention, the network interface 1050 may be connected to or to provide or access a high-speed connection to the Internet or an Intranet providing access to the Internet or similar networks. Using such a network or networks, computing device 1000 can communicate identifiers of destination parties to a mobile application serve.

Stored in data storage device 1095 may also be other elements that may be necessary for operation of computing device 1000, such as other applications, other data files, a network server, an operating system, a database management system and "device drivers" for allowing microprocessor 1030 to interface with external devices. These elements are known to those skilled in the art, and are therefore not described in detail herein.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. Features of any of the variously described embodiments may be used in other embodiments. The form herein before described being merely an explanatory embodiment thereof. It is the intention of the following claims to encompass and include such changes.

What is claimed is:

1. A method for high-performance terrain rendering via a topographical program executed by a computing device, the method comprising the steps of:
   obtaining elevation data;
   determining slope of a terrain surface;
   selecting a shading model to apply to the terrain surface based upon the slope of the terrain surface;
   storing an image dataset of surface normals as a polar-coordinate index to a shading look-up table stored in a memory of the computing device, the shading look-up table being loaded with shading percentages derived from the shading model, said shading percentages being computed off-line;
   adding a correction angle to a horizontal azimuth of the index when adjusting a lateral angle of an illumination source; and
   applying the index having the added correction angle to the shading lookup table.

2. The method of claim 1, further comprising the step of determining if a vehicles heading has changed.

3. The method of claim 2, further comprising the step selecting a new shading model based upon a number of light sources.

4. The method of claim 3, wherein the slope of the terrain surface is calculated from DTED data.

5. The method of claim 4, wherein the slope of the terrain surface is calculated from bathymetric data.

6. The method of claim 1, wherein all shading models are stored in memory.

7. The method of claim 1, wherein the shading model is in a polar coordinate system.

8. A terrain light shading system comprising:
   a data storage device comprising:
      a topographical program that determines shading for topography around a vehicle based upon a predetermined shading process; and
      a processor coupled to a memory of the data storage device, said processor executing the topographical program, said memory storing a shading look-up table, said memory further storing an image dataset of surface normals as a polar-coordinate index to the shading look-up table, the shading look-up table including a plurality of shading blocks for several terrain scenarios, said shading blocks being derived from at least one shading model, said shading blocks being computed offline;
   wherein the topographical program adds a correction angle to a horizontal azimuth of the index when adjusting a lateral angle of an illumination source, said topographical program also applying the index having the added correction angle to the shading lookup table.

9. The system of claim 8, wherein the topographical program shades a terrain based upon a slope of the terrain.

10. The system of claim 9, wherein the topographical program shades the terrain based upon a predetermined amount of light sources.

11. The system of claim 10, wherein the topographical program shades the terrain based upon a bearing of the vehicle.

12. A non-transitory, machine readable medium comprising machine executable instructions, including:
   slope instructions that compute a north-south and east west slope;
   surface normal instructions that calculate a surface normal based upon the north-south and east-west slope, the surface normal being stored as a polar coordinate index to a shading table lookup table stored in a memory;
   shading instructions that calculate a shading percentage for at least one point on a topography based on the surface normal, wherein the calculated shading is calculated off-line and stored in the shading lookup table;
   instructions for adjusting a lateral angle of an illumination source by adding a correction angle to a horizontal azimuth of the index; and
   instructions for applying the index having the added correction angle to the shading lookup table.

13. The medium of claim 12, further comprising display instructions that display a pixel.

14. The medium of claim 13, wherein the pixel is stored in the shading lookup table.

* * * * *